US008769054B2

(12) United States Patent
Robbin et al.

(10) Patent No.: US 8,769,054 B2
(45) Date of Patent: *Jul. 1, 2014

(54) PAIRING A MEDIA SERVER AND A MEDIA CLIENT

(75) Inventors: Jeffrey Robbin, Los Altos, CA (US); Christopher R. Wysock, Los Gatos, CA (US); Amandeep Jawa, San Francisco, CA (US); Jeffrey Miller, Mountain View, CA (US); David Heller, Los Altos, CA (US); Justin Henzie, Concord, CA (US); Rainer Brodersen, San Jose, CA (US); Mihnea Calin Pacurariu, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/609,219

(22) Filed: Sep. 10, 2012

(65) Prior Publication Data
US 2013/0097286 A1    Apr. 18, 2013

Related U.S. Application Data

(63) Continuation of application No. 11/620,907, filed on Jan. 8, 2007, now Pat. No. 8,285,851.

(51) Int. Cl.
*G06F 15/177* (2006.01)
*G06F 15/173* (2006.01)

(52) U.S. Cl.
USPC ............................ 709/219; 709/223; 709/227

(58) Field of Classification Search
None
See application file for complete search history.

(56) References Cited

U.S. PATENT DOCUMENTS

| 6,909,721 | B2 | 6/2005 | Ekberg et al. |
| 7,346,616 | B2 | 3/2008 | Ramanujam et al. |
| 7,577,757 | B2 * | 8/2009 | Carter et al. ................. 709/248 |
| 7,627,808 | B2 | 12/2009 | Blank et al. |
| 7,743,338 | B2 | 6/2010 | Madden |
| 7,743,341 | B2 | 6/2010 | Brodersen et al. |
| 7,747,968 | B2 | 6/2010 | Brodersen et al. |

(Continued)

FOREIGN PATENT DOCUMENTS

| WO | WO2005119463 | 12/2005 |
| WO | WO2008033665 | 3/2008 |

(Continued)

OTHER PUBLICATIONS

PCT/US2008/050385. Int'l Preliminary Report on Patentability (Jul. 23, 2009).

(Continued)

*Primary Examiner* — Umar Cheema
(74) *Attorney, Agent, or Firm* — Womble Carlyle Sandridge & Rice LLP

(57) ABSTRACT

A system for use in presenting media content includes a media server configured to provide media content and a media client configured to obtain the media content from the media server and to present the media content on a device. The media client is configured to generate a first code and to transmit information to the media server. The information identifies the media client and the information indicates that the media client is available for pairing. The media server is configured to reply to the information with a second code that corresponds to the first code in order to enable pairing between the media server and the media client.

15 Claims, 7 Drawing Sheets

(56) References Cited

U.S. PATENT DOCUMENTS

| | | |
|---|---|---|
| 7,831,727 B2 | 11/2010 | Brodersen et al. |
| 7,853,972 B2 | 12/2010 | Brodersen et al. |
| 7,865,927 B2 | 1/2011 | Brodersen et al. |
| 7,930,650 B2 | 4/2011 | Brodersen et al. |
| 7,984,377 B2 | 7/2011 | Ma et al. |
| 2005/0021866 A1 | 1/2005 | Kang et al. |
| 2006/0083187 A1 | 4/2006 | Dekel |
| 2006/0143455 A1 | 6/2006 | Gitzinger |
| 2007/0011237 A1 | 1/2007 | Mockett |
| 2007/0143493 A1 | 6/2007 | Mullig et al. |
| 2007/0150415 A1* | 6/2007 | Bundy et al. .......... 705/51 |
| 2007/0206247 A1 | 9/2007 | Kaplan |
| 2007/0266247 A1 | 11/2007 | Kirkup et al. |
| 2008/0062127 A1 | 3/2008 | Brodersen et al. |
| 2008/0062128 A1 | 3/2008 | Brodersen et al. |
| 2008/0062137 A1 | 3/2008 | Brodersen et al. |
| 2008/0062894 A1 | 3/2008 | Ma et al. |
| 2008/0065638 A1 | 3/2008 | Brodersen et al. |
| 2008/0065720 A1 | 3/2008 | Brodersen et al. |
| 2008/0065722 A1 | 3/2008 | Brodersen et al. |
| 2008/0066010 A1 | 3/2008 | Brodersen et al. |
| 2008/0066013 A1 | 3/2008 | Brodersen et al. |
| 2008/0066099 A1 | 3/2008 | Brodersen et al. |
| 2008/0066100 A1 | 3/2008 | Brodersen et al. |
| 2008/0066110 A1 | 3/2008 | Brodersen et al. |
| 2008/0066135 A1 | 3/2008 | Brodersen et al. |
| 2008/0122870 A1 | 5/2008 | Brodersen et al. |
| 2010/0111434 A1 | 5/2010 | Madden |
| 2010/0185982 A1 | 7/2010 | Brodersen et al. |
| 2010/0235792 A1 | 9/2010 | Brodersen et al. |
| 2011/0154394 A1 | 6/2011 | Brodersen et al. |

FOREIGN PATENT DOCUMENTS

| | | |
|---|---|---|
| WO | WO2008033734 | 3/2008 |
| WO | WO2008033777 | 3/2008 |
| WO | WO2008033778 | 3/2008 |
| WO | WO2008033835 | 3/2008 |
| WO | WO2008086275 | 7/2008 |

OTHER PUBLICATIONS

PCT/US2008/050385. Int'l Search Report and Written Opinion (Sep. 5, 2008).

* cited by examiner

PAIRING A MEDIA SERVER AND A MEDIA CLIENT

CROSS-REFERENCE TO RELATED APPLICATIONS

This application is a continuation of U.S. patent application Ser. No. 11/620,907, filed on Jan. 8, 2007 entitled "PAIRING A MEDIA SERVER AND A MEDIA CLIENT," now U.S. Pat. No. 8,285,851 issued Oct. 9, 2012, which is hereby incorporated herein by reference in its entirety.

TECHNICAL FIELD

This patent application relates to pairing a media server and a media client.

BACKGROUND

Generally speaking, a media server provides access to media content, such as movies, televisions shows, and music. A media client communicates with the media server in order to access the media content. Often, several media servers and media clients occupy the same network neighborhood, making possible communication among the various media servers and clients. This is particularly true in relatively living close quarters, such as dormitories or apartment buildings, where several wireless networks occupy the same physical space.

Although communication may be possible among various media servers and clients, typically, communication is desired among a limited number of media servers and media clients. For example, a family may include a single media client and multiple media servers. The process of enabling a media client to communicate with a media server is known as pairing.

SUMMARY

Disclosed herein is a process for pairing a media server and a media client to thereby enable communication between the two.

In general, in one aspect, this patent application describes a method performed by a media client. The method comprises entering a pairing mode, generating a first code for pairing with a media server, receiving a second code from the media server, determining if the first code corresponds to the second code, and pairing with the media server if the first code corresponds to the second code. This aspect may also include one or more of the following features.

Pairing the media client with the media server may comprise responding to the media server that the first code corresponds to the second code, and enabling communicating between the media client and the media server. Communicating with the media server may comprise receiving, from the media server, a summary of content that is available to the media client for download, and selectively downloading content from the media server. Selective downloading of the media content may comprise retrieving content from the media server according to priority, where the priority dictates an order in which different types of content are to be downloaded. The types of content may comprise movies, televisions shows, music, podcasts, and photographs. The order in which different types of content may be downloaded may be movies, televisions shows, music, podcasts, and photographs. Communicating with the media server may comprise obtaining streaming content from the media server. The media server may comprises a first media server, and pairing with the media server may comprise an ability to synch content from the first media server to the media client for later presentation. The method performed by the media client may further comprise generating a third code for pairing with a second media server, receiving a fourth code from the second media server, determining if the third code corresponds to the fourth code, and accessing streaming content from the second media server if the third code corresponds to the fourth code and while a pairing with the first media server is maintained.

In general, in another aspect, this patent application describes a method performed by a media server. The method comprises receiving a code via an interface, outputting the code over a network, receiving an indication via the network that the code corresponds to a media client, and pairing the media server with the media client in response to the indication. This aspect may also include one or more of the following features.

The method may further comprise sending, to the media client, a summary of content that is available on the media server for download, receiving data indicating content that the media client has selected for download, and providing selected content to the media client. The selected content may comprise streaming content. The interface may comprise a graphical user interface, and the method may further comprise generating the graphical user interface.

In general, in another aspect, this patent application is directed to a system for use in presenting media content. The system comprises a media server configured to provide media content, and a media client configured to obtain the media content from the media server and to present the media content on a device. The media client is configured to generate a first code and to transmit information to the media server. The information identifies the media client and the information indicates that the media client is available for pairing. The media server is configured to reply to the information with a second code that corresponds to the first code in order to enable pairing between the media server and the media client. This aspect may also include one or more of the following features.

The media client may be configured to reply to the second code with an indication that the second code corresponds to the first code. The media server may be configured to provide, in response to the indication, a summary of media content available to the media client for download. The media client may be configured to selectively download media content from the media server. Selective downloading may comprise retrieving media content from the media server according to priority. The priority may dictate an order in which different types of media content are to be downloaded. The order in which different types of media content are to be downloaded may be movies, televisions shows, music, podcasts, and photographs.

The media server may comprise a first media server. The system may further comprise a second media server configured to provide media content. The media client may be configured to generate a third code and to transmit information to the second media server. The information may identify the media client and indicate that the media client is available to receive media content. The second media server may be configured to reply to the information with a fourth code that corresponds to the third code in order to enable transmission of streaming media content from the second media server to the media client. The media client may remain paired to the first media server when streaming of media content to the second media server is enabled.

In general, in another aspect, this patent application describes a media client configured to communicate with a media server in order to receive media content. The media client comprises memory to store instructions for execution and a processing device to execute the instructions in order to pair with the media server and to present the media content for display. The instructions cause the processing device to generate a first code, receive a second code from the media server, pair the media client with the media server if the first code corresponds to the second code, and exchange communications with the media server following pairing. This aspect may also include one or more of the following features.

A remote control device may be configured to communicate wirelessly with the processing device. The remote control device may comprise a touch-sensitive area for inputting control information used to control the media client. The touch-sensitive area may comprise part of a rotational input area. The remote control device may comprise a near-contact area for inputting control information used to control the media client. The near-contact area does not require contact in order to input the control information.

The details of one or more examples are set forth in the accompanying drawings and the description below. Further features, aspects, and advantages are apparent in the description, the drawings, and the claims.

DETAILED DESCRIPTION

Figure 1:
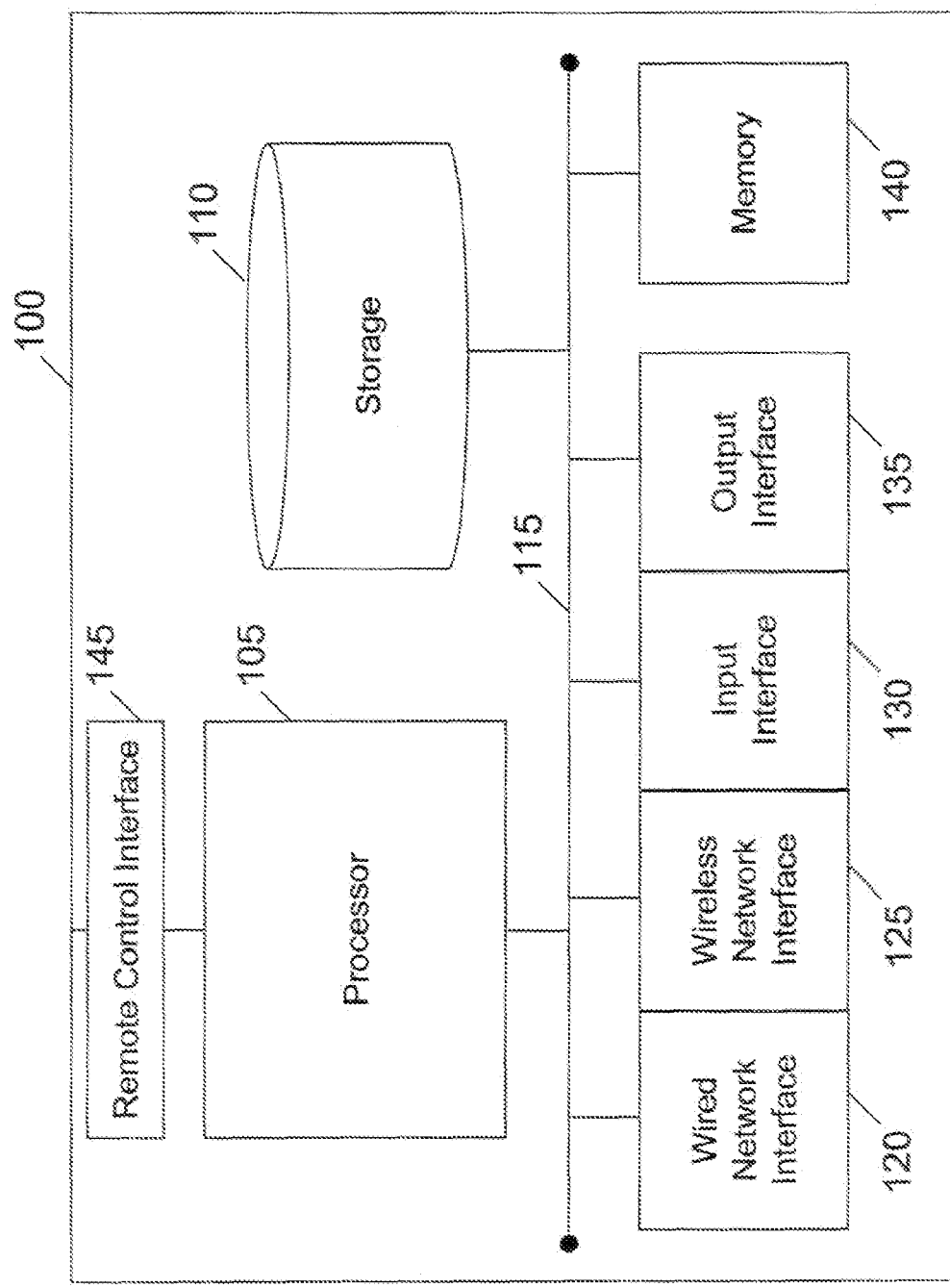
FIG. 1 is a block diagram of a media client.

FIG. 1 presents a media processing device 100 that can be configured to present one or more types of media through an output device, including audio, video, images, or any combination thereof. The media processing device 100 includes a processor 105 configured to control the operation of the media processing device 100. For example, the processor 105 can control communications with one or more media servers to receive media (also referred to as "media content") for playback. The media can be received through push and/or pull operations, including through downloading and streaming. The processor 105 also can be configured to generate output signals for presentation, such as one or more streams representing media content or an interface for interacting with a user.

The media processing device 100 also includes a storage device 110 that can be configured to store information including media, configuration data, and operating instructions. The storage device 110 can be any type of non-volatile storage, including a hard disk device or a solid-state drive. For example, media received from an external media server can be stored on the storage device 110. The received media thus can be locally accessed and processed. Further, configuration information, such as the resolution of a coupled display device or information identifying an associated media server, can be stored on the storage device 110. Additionally, the storage device 110 can include operating instructions executed by the processor 105 to control operation of the media processing device 100. In an implementation, the storage device 110 can be divided into a plurality of partitions, wherein each partition can be utilized to store one or more types of information and can have custom access control provisions.

A communication bus 115 couples the processor 105 to the other components and interfaces included in the media processing device 100. The communication bus 115 can be configured to permit unidirectional and/or bidirectional communication between the components and interfaces. For example, the processor 105 can retrieve information from, and transmit information to, the storage device 110 over the communication bus 115. In an implementation, the communication bus 115 can be comprised of a plurality of busses, each of which couples at least one component or interface of the media processing device 100 with another component or interface.

The media processing device 100 also includes a plurality of input and output interfaces for communicating with other devices, including media servers and presentation devices. A wired network interface 120 and a wireless network interface 125 each can be configured to permit the media processing device 100 to transmit and receive information over a network, such as a local area network (LAN) or the Internet. Additionally, an input interface 130 can be configured to receive input from another device through a direct connection, such as a USB or an IEEE 1394 connection.

Further, an output interface 135 can be configured to couple the media processing device 100 to one or more external devices, including a television, a monitor, an audio receiver, and one or more speakers. For example, the output interface 135 can include one or more of an optical audio interface, an RCA connector interface, a component video interface, and a High-Definition Multimedia Interface (HDMI). The output interface 135 also can be configured to provide one signal, such as an audio stream, to a first device and another signal, such as a video stream, to a second device. Further, a memory 140, such as a random access memory (RAM) and/or a read-only memory (ROM) also can be included in the media processing device 100. As with the storage device 110, a plurality of types of information, including configuration data and operating instructions, can be stored in the memory 140.

Additionally, the media processing device 100 can include a remote control interface 145 that can be configured to receive commands from one or more remote control devices (not pictured). The remote control interface 145 can receive the commands through wireless signals, such as infrared and radio frequency signals. The received commands can be utilized, such as by the processor 105, to control media playback or to configure the media processing device 100.

Figure 2:
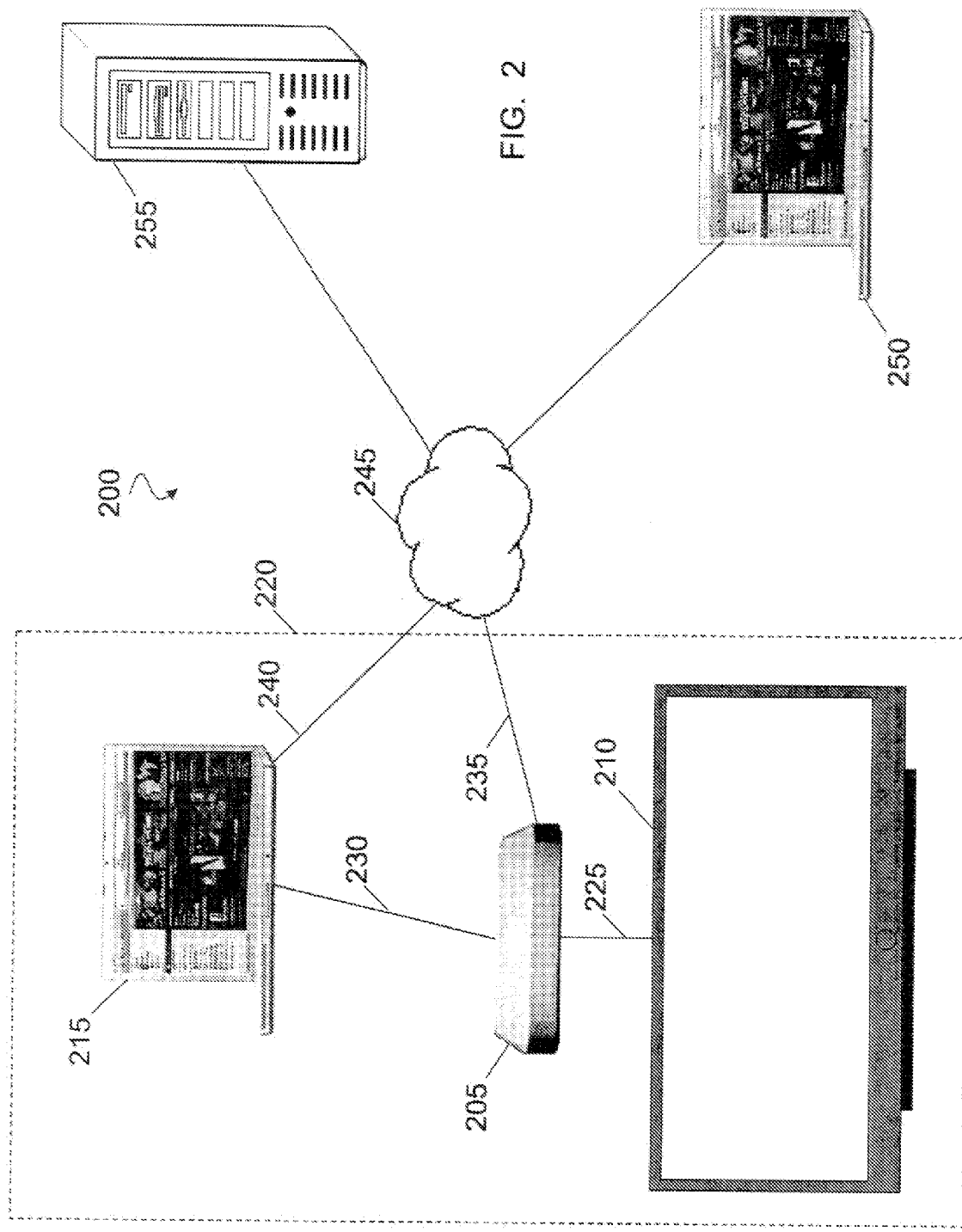
FIG. 2 is a block diagram of system that includes the media client and media servers for exchanging media content among members of the system.

FIG. 2 presents a media system 200 that includes a media processing device 205, which may have the configuration of FIG. 1. The media system 200 includes a host location 220, such as a home or office, in which the media processing device 205 is installed. The host location 220 also can include a local media server 215 and a presentation device, such as a monitor 210. The monitor 210 can be coupled to the media processing device 205 through a media connector 225, such that video and/or audio information output by the media processing device 205 can be presented through the monitor 210. Further, the media processing device 205 can be coupled to the local media server 215 through a local connection 230, such as a wired network connection, a wireless network connection, or a direct connection. As such, the media processing device 205 can receive media content from the local media server 215. The local media server 215 can be any computing device, including a personal computer, a server, a palm top computer, or a media device capable of storing and/or playing back media content.

Further, the media processing device 205 and the local media server 215 can include network connections 235 and 240 respectively, which provide access to a network 245, such as the Internet. In an implementation, the media processing device 205 can communicate with a remote media server 250 and/or a media store 255 over the network 245. For example, a connection can be established between the media processing device 205 and the remote media server 250. The connection can be secure or unsecure. Thereafter, the media processing device 205 can receive media content from the remote media server 250, such as by streaming or downloading. Thus, the media processing device 205 acts as a media client of one or more devices and/or services from which it receives media content.

In this regard, the media processing device 205 can be configured to receive media content from a media store 255. For example, upon establishing a connection, the media processing device 205 can request a list of available media content from the media store 255. The list of available media content can include free content, such as trailers and podcasts, and for-purchase content, such as movies, television programs, and music. Additionally, the media processing device 205 can be configured to communicate with the media store 255 to validate media content, such as by verifying digital rights management information.

The media processing device 205 may be used to process, for example, audio data received over one or more networks. Such audio data may include metadata, e.g., song information related to the audio data received. The media processing device 205 may be used to process, for example, video data. Such video data may include metadata, e.g., programming information related to the video data received. The video data and related metadata may be provided by a single provider, or may be provided by separate providers. The media processing device 205 can present the video data in one or more contexts, such as a received/broadcast context and a recording/playback context.

Processing video data in the received/broadcast context can include processing broadcast video data that is either live, e.g., a sporting event, or pre-recorded, e.g., a television programming event. In the received context, the media processing device 205 may buffer the received video data. The video data can be buffered for the entire program. The video data can be buffered for a time period, e.g., twenty minutes. The media processing device may also buffer the video data during user-initiated events, such as during a pause. Thus, when the user resumes normal viewing, video data is processed from the pause time.

Processing video data in the recording/playback context can include processing video data that is played back from a recording stored on the media processing device 205. In another implementation, processing video data in the playback context can include processing video data that is stored on a remote data store and received over a network, such as a cable network. In both playback implementations the media processing device 205 may perform playback processes such as play, pause, fast forward, rewind, etc.

Each media processing device may include a remote control device. The remote control device can include a rotational input device configured to sense touch actuations and generate remote control signals therefrom. The touch actuations can include rotational actuations, such as when a user touches the rotational input device with a digit and rotates the digit on the surface of the rotational input device. The touch actuations can also include click actuations, such as when a user presses on the rotational input device with enough pressure to cause the remote control device to sense a click actuation.

Figure 2A:
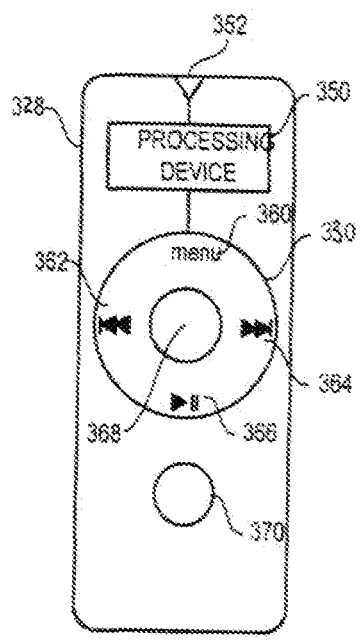
FIG. 2A is a diagram of a remote control that may be used with the media client.

FIG. 2A is a block diagram of an example remote control device 328 for, e.g., media processing device 205. The remote control device 328 includes a rotational input device 330, a processing device 350, and a wireless communication subsystem 352. The rotational input device 330 defines a surface that can sense a touch actuation, such as the presence of a finger on the surface, and can further generate a control signal based on a rotation of the finger on the surface. In one implementation, a touch sensitive array is disposed beneath the surface of the rotational input device 330. The touch sensitive array can be disposed according to polar coordinates, i.e., r and $\Theta$, or can be disposed according to Cartesian coordinates, i.e., x and y, or other similar coordinate system.

The rotational input device areas 360, 362, 364, 366 and 368 are receptive to press actuations. The areas may include a menu area 360, a reverse/previous area 362, a play/pause area 364, a forward/next area 366, and a select area 368. The areas 360 to 368, in addition to generating signals related to their descriptive functionalities, can also generate signals for context-dependent functionality. For example, the menu area 360 can generate signals to support the functionality of dismissing an onscreen user interface, and the play/pause area 364 can generate signals to support the function of drilling down into a hierarchal user interface. In one implementation, the areas 360 to 368 comprise buttons disposed beneath the surface of the rotational input device 330. In another implementation, the areas 360 to 368 comprise pressure sensitive actuators disposed beneath the surface of the rotational input device 330.

The processing device 350 is configured to receive the signals generated by the rotational input device 330 and generate corresponding remote control signals in response. The remote control signals can be provided to the communication subsystem 352, which can wirelessly transmit the remote control signals to media processing device 205, where they are received via remote control interface 145.

Although shown as comprising a circular surface, in another implementation, the rotational input device 330 can comprise a rectangular surface, a square surface, or some other shaped surface. Other surface geometries that accommodate pressure sensitive areas and that can sense touch actuations may also be used, e.g., an oblong area, an octagonal area, etc.

Other actuation area configurations may also be used. For example, in another implementation, the remote control device 328 can also include a separate actuation button 370. In this implementation, the areas comprise a "+" or increase area 360, a reverse/previous area 362, a "−" or decrease area 364, a forward/next area 366, a play/pause area 368, and a menu area 370.

In other implementations, the remote control device 328 can be operated using touch-based operations, near-contact operations or combinations thereof. For example, the remote control device 328 can be embedded with a proximity detection mechanism that can sense the presence of an input device, for example, a user's finger, without requiring contact with the surface of the remote control device 328.

A user can use a key board and virtually any suitable pointing device (e.g., mouse, track ball, stylus, touch screen)

to interact with control software associated with the media processing device. The pointing device can also be operated by a near contact screen (e.g., a touch screen) that employs a regional sensing field to detect objects in the proximity.

Figure 3:
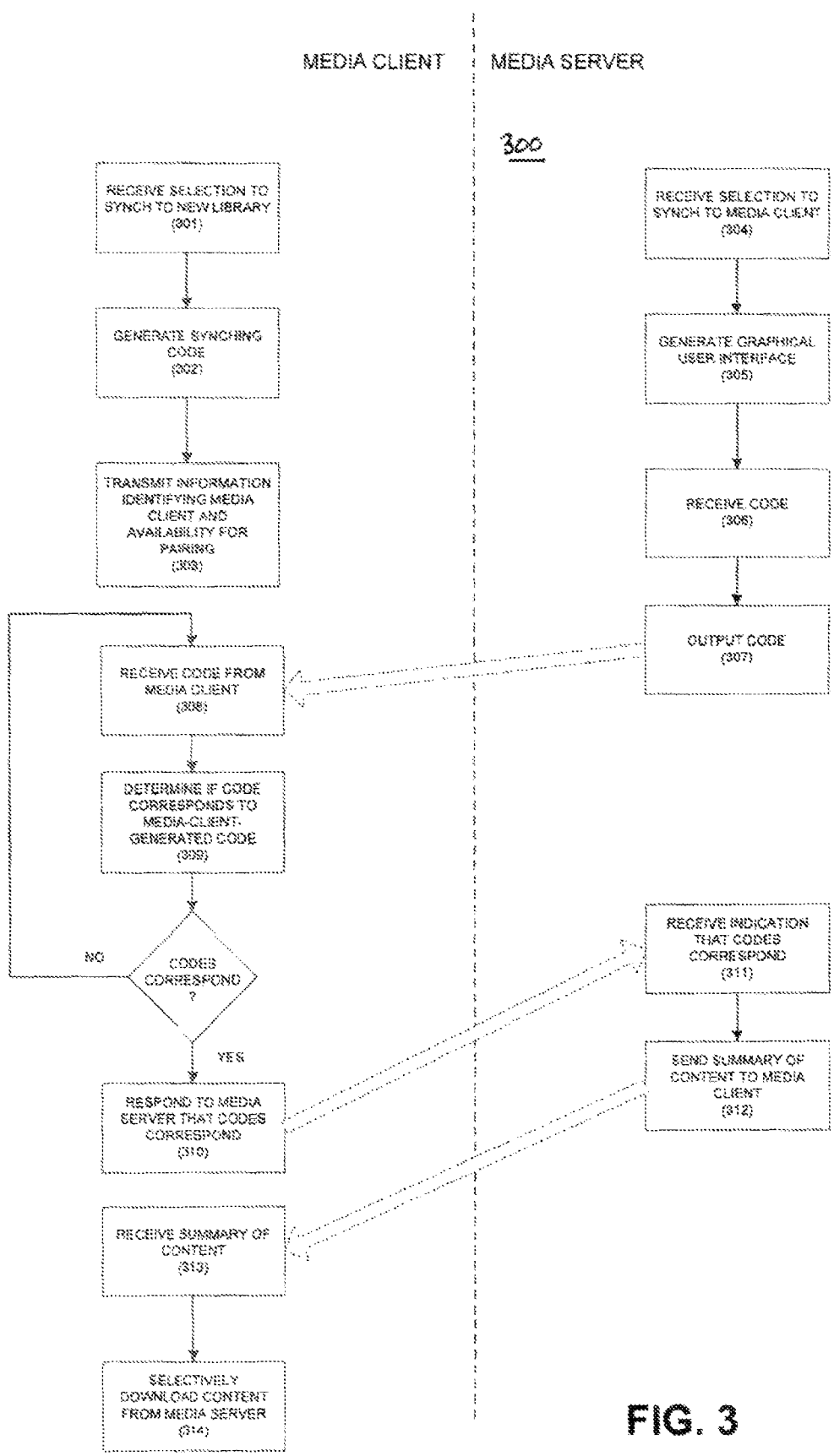
FIG. 3 is a flowchart showing a process for pairing a media client and a media server for synching content between the two.

FIG. 3 shows a process 300 for pairing a media server and a media client. Pairing associates a media server and a media client so as to enable communication between the two. Communications may be exchanged over any type of wired or wireless connection, examples of which include, but are not limited to, Ethernet, telephone lines, wireless fidelity (Wi-Fi), and/or Bluetooth. The communications may include media content, such as movies, television shows, music, podcasts, and/or photographs. Pairing via process 300 may be implemented through computer programs executing on the media server and media client.

There are two types of pairing that may be set between a media server and a media client. These two types are referred to as synchronized (synch) pairing and streaming pairing. During synch pairing, media content is transferred from a media server to the media client for later presentation on a device. For example, media server 215 may transfer media content to media client 205 for presentation on monitor 210. During synch pairing, media content is selected and all of the selected media content is downloaded to the media client prior to presentation. Alternatively, rather than downloading all of the selected media content, a predetermined amount of selected media content (e.g., a chapter or episode) may be downloaded, and the rest may be downloaded at a later time. During streaming pairing, media content, such as video, is presented substantially as it is downloaded. Streaming involves downloading the media content from a media server (e.g., media server 215 or media store 255) to the media client (e.g., media client 205), buffering the media content at the media client, and playing the media content in about real-time, e.g., about as it is being downloaded, on a device (e.g., monitor 210).

Figure 4:
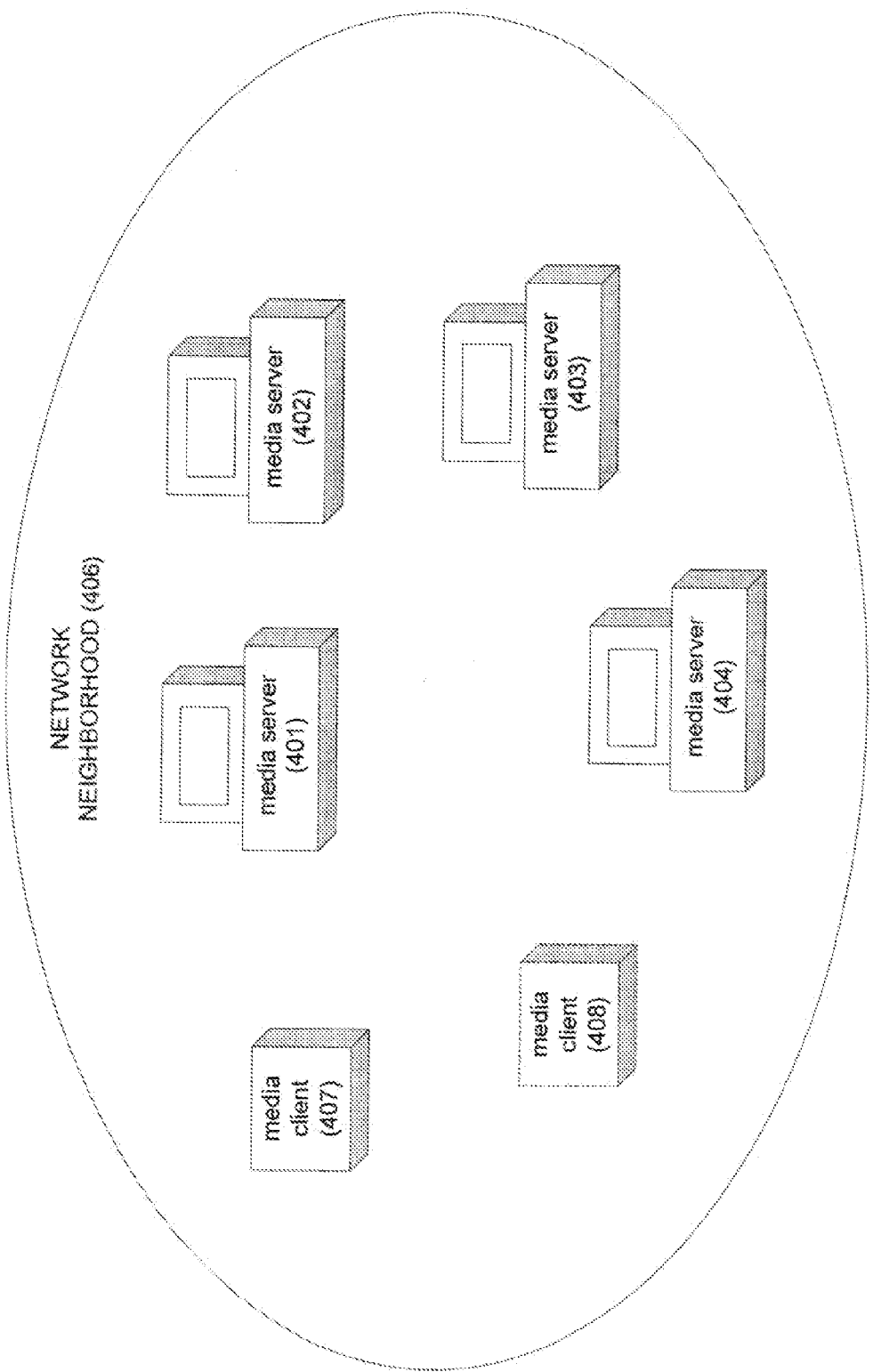
FIG. 4 is a block diagram of a network neighborhood that includes media servers and media clients.

FIG. 4 shows multiple media servers 401 to 404 within a network neighborhood 406 of a media client 407. Media servers 401 to 404 may be of the type described above with respect to FIG. 2, and media client 407 may be of the type described above with respect to FIG. 2. Media client 407 is capable of communication with any one or more of media servers 401 to 404. A user initiates process 300 (FIG. 3) to pair media client 407 to one of the media servers 401 for synching. Pairing for streaming is described below.

Referring to FIG. 3, the left-hand portion shows actions performed by media client 407 and the right-hand portion shows actions performed by media server 401. Media client 407 receives (301) a selection to synch to a new media server library. The selection may be input by a user via a drop-down menu on a graphical user interface (GUI) (not shown) generated by the media client and displayed on an associated video display device. The user selects to synch to a new media library. Following selection, media client 407 enters a pairing mode, during which media client 407 is capable of pairing with a corresponding media server. In the pairing mode, media client 407 generates (302) a code for use in pairing with a media server. In one implementation, the code is a randomly-generated five-digit number; however, any type of alphanumeric (or other) code may be used. Alternatively, the code may be user-assigned or obtained via other processes.

Media client 407 uses multicast DNS (domain name service) to connect to a media server. Specifically, media client 407 transmits (303), to the network, information identifying the media client and indicating that the media client is available for pairing. The information may include a network address of the media client, such as its IP (Internet protocol) address. Media client 407 waits for a response to the information. In this implementation, pairing will not occur until a response is received.

Figure 5:
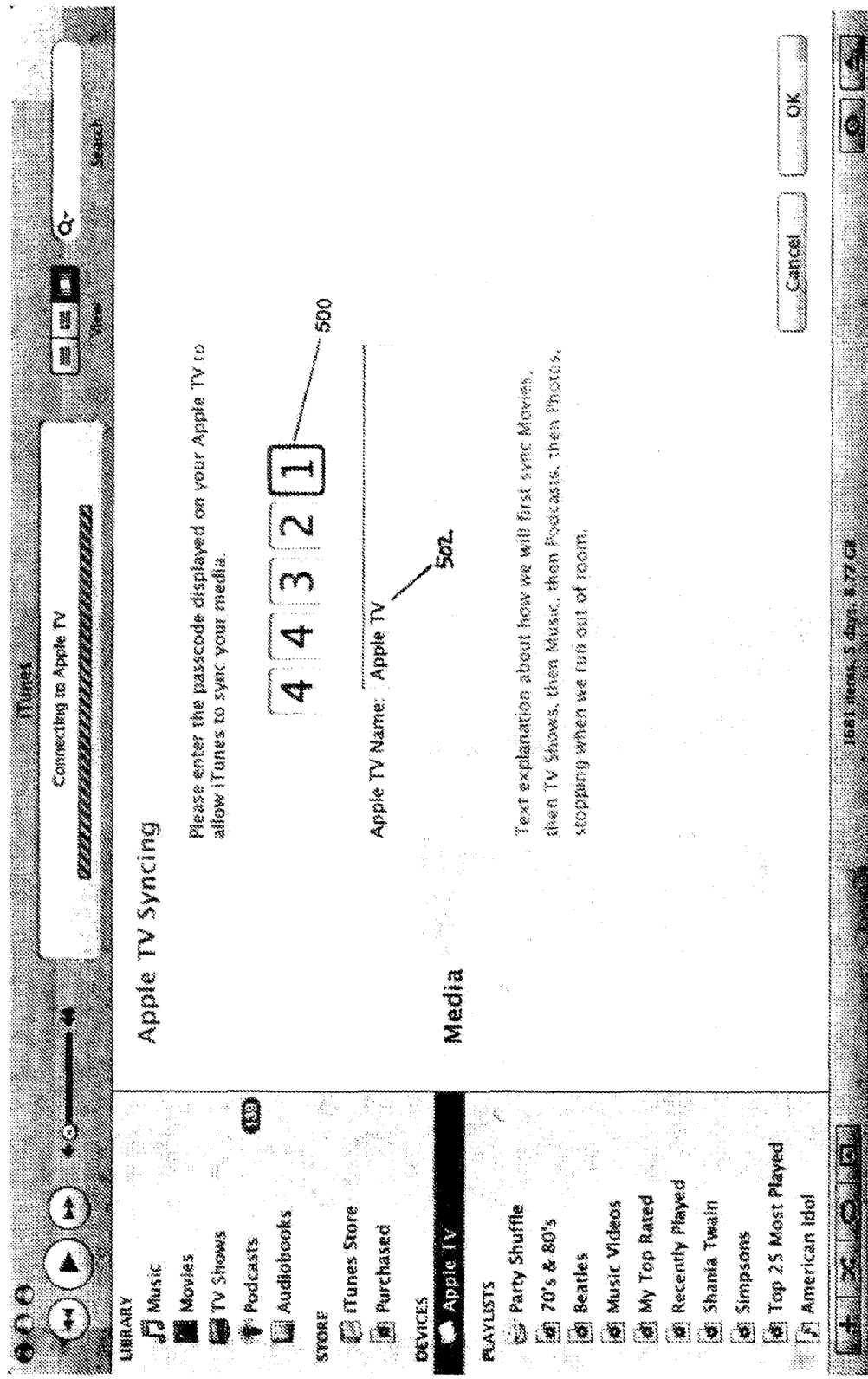
FIG. 5 is a screen shot of a graphical user interface generated by a media server.

To effect pairing, the code generated by media client 407 is provided to media server 401. Specifically, media server 401 receives (304) a selection to synch to a media client. The selection may be received via a drop-down menu provided on a GUI generated by the media server. In response to the selection, media server 401 generates (305) a GUI 501 (FIG. 5), into which a user may input the code generated by the media client. That is, the user reads the code from a display device associated with the media client, and inputs the code 500 to GUI 501. The user may also input the name 502 of the media client, in this case, "Apple TV". Media server 401 receives (306) the code and uses the code to pair to media client 407. In particular, media server 401 outputs (307) a message, which includes the code, over the network. The message includes a request to pair with a media client. Multiple media clients may be on the network, each of which may receive the request. For example, as shown in FIG. 4, an additional media client 408 may be present in network neighborhood 406, and may also receive the code.

Media client 407 receives (308) the request and code from media server 401, and determines (309) if the code corresponds to the code that was generated by media client 407. For example, the two codes may match, or some mathematical algorithm may be used to compare the two codes to determine if they substantially correspond to each other. Media client 407 responds (310) to media server 401 indicating that the code provided by the media server match or, e.g., that the two codes are close enough to be considered equivalent. Other media clients in the network neighborhood, such as media client 408, may receive the code, but will not respond, since the code does not match codes generated by those other media clients. If a received code does not match a generated code, a media client may simply await receipt of a new code.

Media server 401 receives (311) the response from media client 407 that the two codes correspond. Thereafter, media client 401 and media server 407 are paired, and communications may be exchanged between media server 401 and media client 407. The communications may be coded using identities of the media server and media client, or the communications may be directed to the addresses of the media server and media client.

In this example, media server 401 sends (312), to media client 407, a summary of media content available for download on the media server. The summary may be a table of contents or other data identifying the media content. Media client 407 receives (313) the summary and presents the summary, or selected information contained therein, on a video display device. Media client 407 is then able to selectively download (314) media content from media server 401. In particular, media client 407 retrieves or "pulls" content from the media server, e.g., by identifying the content in one or more requests that are sent to the media server. In response to such request(s), media server 401 sends the media content to media client 407.

The content may be downloaded according to a predefined priority, which dictates an order in which different types of media content are to be downloaded. For example, movies may be downloaded first, followed, in sequence, by television shows, music, podcasts, and photographs. A user may alter the predefined priority, e.g., to retrieve selected media content. Furthermore, the ability to download media content may be affected by the amount of storage space available on the media client. For example, if there is not sufficient storage space on the media client, newly-downloaded media content may take the place of content already on the media client. Alternatively, if there is not sufficient storage space on the media client, newly-selected media client may not be downloaded. A user may set download preferences in order to control how downloading occurs in this instances.

Once media content has been downloaded, media client 407 may present that media client on a device, such as a video display device and/or an audio device.

The foregoing describes pairing in order to download media content for later presentation (i.e., "synching" the media client and the media server). In this implementation, the media client may synch to only one media server at a time, although this may not be the case in other implementations. As noted above, the media client may also pair to other media servers in order to obtain streaming media content from those other media servers. In this implementation, when pairing to other media servers for streaming purposes, the media client remains paired to its "synched" media server. As a result, in this implementation, the media client may obtain content for later presentation only from its synched media server. The media client may, however, pair with other media servers to obtain streaming content from those other media servers, including, e.g., a media store 255 (FIG. 2). In one implementation, the media client may pair with five other media servers for this purpose; however, the pairing process is not so limited. In other implementations, any number of other media servers may be paired for streaming.

Figure 6:
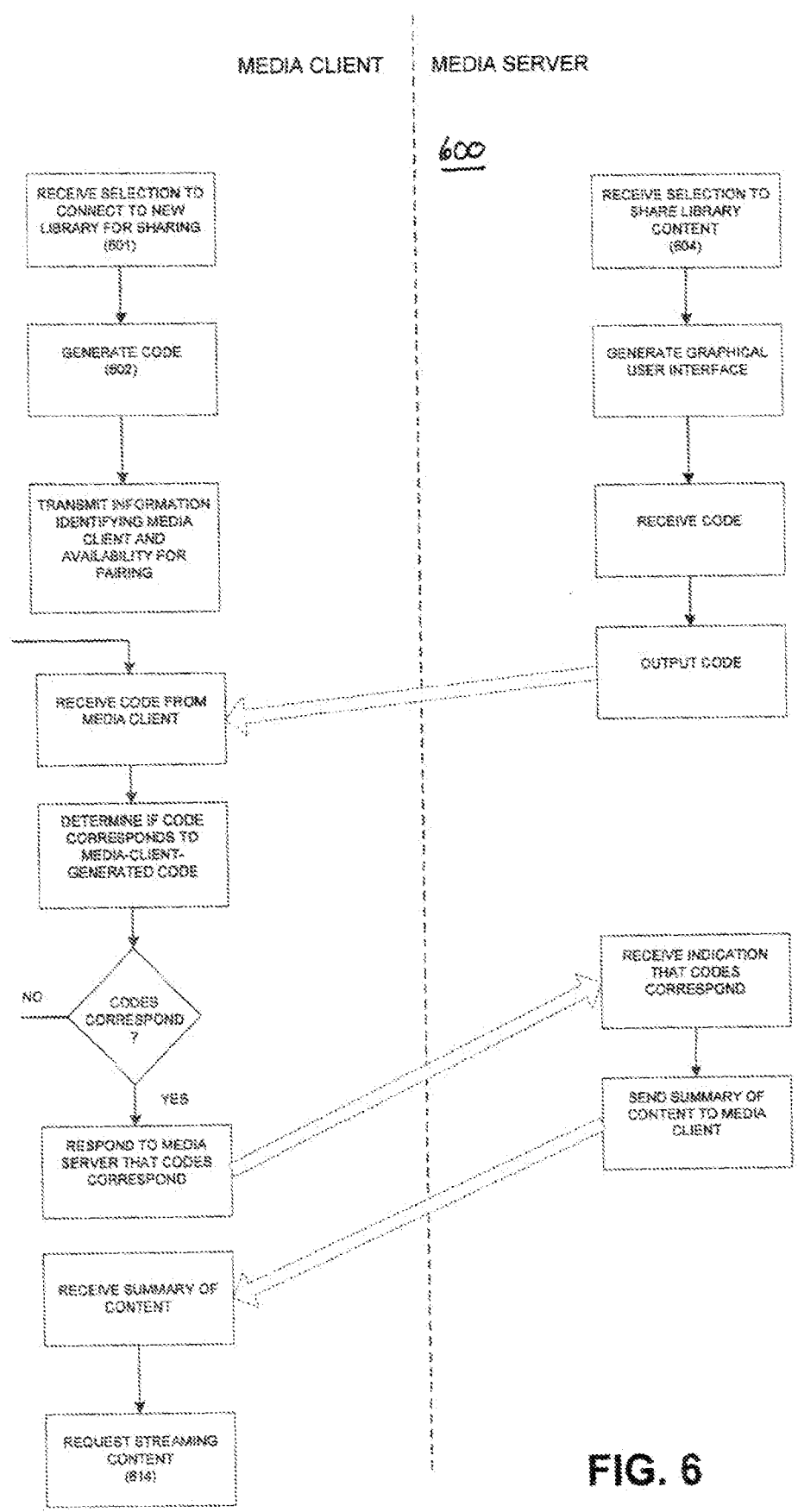
FIG. 6 is a flowchart showing a process for pairing a media client and a media server for streaming content between the two.

FIG. 6 shows a process 600 for pairing a media client with a media server in order to obtain streaming media content from the media server. The streaming media content may include audio, video, podcasts, televisions shows, and/or other types of content. Process 600 is identical to process 300, except that, initially, the user selects to connect to a new library for streaming purposes. This may be referred to as "sharing" content of a library. A media client 407 receives (601) the selection to connect to a library for sharing, and generates (602) a "sharing" code. Thereafter, process 600 proceeds in the same manner as process 300, up to action 604, where the media server (e.g., media server 402) receives a selection to share library content. Process 600 then proceeds in a similar manner to process 300 up to action 614. At that point, the media client 407 (e.g., in response to user selection) requests (614) streaming media content from media server 402. Media server 402 provides the streaming media content to the media client, where it may be cached for presentation, e.g., substantial real-time presentation.

The processes described herein are not limited to use with any particular hardware, software, or programming language; they may find applicability in any computing or processing environment and with any type of machine that is capable of running machine-readable instructions. All or part of the processes can be implemented in digital electronic circuitry, or in computer hardware, firmware, software, or in combinations thereof. Hardware on the client and/or server side may be, e.g., part of a desktop or laptop personal computer, a personal digital assistant (PDA), a cellular or other mobile telephone, a personal media player, etc.

All or part of the processes can be implemented as a computer program product, e.g., a computer program tangibly embodied in an information carrier, e.g., in one or more machine-readable storage media or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions associated with the processes can be performed by one or more programmable processors executing one or more computer programs to perform the functions of the processes. The actions can also be performed by, and the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include a processor for executing instructions and one or more storage area devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

All or part of the processes can be implemented in a computing system that includes a back-end component, e.g., as a data server, or that includes a middleware component, e.g., an application server, or that includes a front-end component, e.g., a client computer having a graphical user interface, or any combination of such back-end, middleware, or front-end components. The components of the system can be interconnected by any form or medium of digital data communication, e.g., a communication network. Examples of communication networks include a LAN and a WAN, e.g., the Internet.

Actions associated with the processes can be rearranged and/or one or more such actions can be omitted to achieve the same, or similar, results to those described herein.

Elements of different implementations described herein may be combined to form other embodiments not specifically set forth above. Other implementations not specifically described herein are also within the scope of the following claims.

What is claimed is:
1. A method performed by a media server, comprising:
the media server sending media content in both a synchronization mode and a streaming mode to a media client by receiving a code via an interface from the media client, the code comprising information indicating that the media client is available for receiving the media content in both the synchronization mode and the streaming mode; and
pairing with the media client in response to the indication, wherein pairing comprises pairing with the media client in the synchronization mode and in the streaming mode, the synchronization mode for downloading at least a portion of content for later presentation via the media client, and
the streaming mode for downloading content for substantially current presentation via the media client.

2. The method of claim 1, further comprising:
sending, to the media client, a summary of content that is available on the media server for download;
receiving data indicating content that the media client has selected for download; and
providing selected content to the media client.

3. The method of claim 2, wherein the selected content comprises streaming content.

4. The method of claim 1, wherein the interface comprises a graphical user interface, and the method further comprises generating the graphical user interface.

5. A system for use in presenting media content, comprising:
a first media server configured to provide first media content;
a second media server configured to provide second media content; and
a media client configured to obtain the first and second media content from the first and second media servers, respectively, and to output the first and second media content for presentation on a device;
wherein the media client is configured to generate a first code and to transmit first information to the first media server, the first information identifying the media client and the first information indicating that the media client is available for pairing;
wherein the first media server is configured to reply to the first information with a second code that corresponds to the first code in order to enable pairing between the first media server and the media client, the first media content comprising synchronized content for later presentation via the media client,
wherein the media client is configured to transmit second information to the second media server, the second information identifying the media client and indicating that the media client is available,
wherein the second media server is configured to reply to the second information with a third code that corresponds to the first code to pair with the second media server to enable transmission of streaming media content from the second media server to the media client, and
wherein the media client remains paired to the first media server when streaming of media content to the second media server is enabled.

6. The system of claim 5, wherein the media client is configured to reply to the second code with an indication that the second code corresponds to the first code; and
wherein the first media server is configured to provide, in response to the indication, a summary of media content available to the media client for download.

7. The system of claim 6, wherein the media client is configured to selectively download first media content from the first media server.

8. The system of claim 7, wherein selectively downloading comprises:
retrieving first media content from the first media server according to priority, the priority dictating an order in which different types of first media content are to be downloaded.

9. The method of claim 8, wherein the types of first media content comprises movies, televisions shows, music, podcasts, and photographs; and
wherein the order in which different types of first media content are to be downloaded is movies, televisions shows, music, podcasts, and photographs.

10. A computer program product tangibly embodied in a non-transitory machine-readable storage medium, the computer program product comprising instructions that are executable by a media client to:
enter a pairing mode that enables the media client to receive media data in both a synchronization mode and a streaming mode from a media server;
generate a first code and a third code for pairing with the media server in the synchronization mode and the streaming mode, respectively;
receive a second code and a fourth code from the media server;
determine if the first code corresponds to the second code and the third code corresponds to the fourth code; and
pair with the media server if the first code corresponds to the second code and the third code corresponds to the fourth code.

11. The computer program product of claim 10, wherein pairing with the media server comprises:
responding to the media server that the first code corresponds to the second code and the third code corresponds to the fourth code; and
enabling communicating with the media server.

12. The computer program product of claim 11, wherein communicating with the media server comprises:
receiving, from the media server, a summary of content that is available to the media client for download; and
selectively downloading content from the media server.

13. The computer program product of claim 12, wherein selectively downloading comprises:
retrieving content from the media server according to priority, the priority dictating an order in which different types of content are to be downloaded.

14. The computer program product of claim 13, wherein the types of content comprise movies, televisions shows, music, podcasts, and photographs; and
wherein the order in which different types of content are to be downloaded is movies, televisions shows, music, podcasts, and photographs.

15. The computer program product of claim 11, wherein communicating with the media server comprises:
obtaining streaming content from the media server.

* * * * *